(12) United States Patent
Bessho et al.

(10) Patent No.: US 12,545,324 B2
(45) Date of Patent: Feb. 10, 2026

(54) WORK VEHICLE

(71) Applicant: Kubota Corporation, Osaka (JP)

(72) Inventors: Hiroki Bessho, Sakai (JP); Yuki Kawabata, Sakai (JP); Satoko Ueno, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 18/805,593

(22) Filed: Aug. 15, 2024

(65) Prior Publication Data

US 2025/0058831 A1    Feb. 20, 2025

(51) Int. Cl.
*B62D 15/02* (2006.01)
*B62D 1/04* (2006.01)

(52) U.S. Cl.
CPC ............ *B62D 15/025* (2013.01); *B62D 1/04* (2013.01)

(58) Field of Classification Search
CPC ........... B62D 15/025; B62D 1/04; B62D 1/20
See application file for complete search history.

(56) References Cited

U.S. PATENT DOCUMENTS

| 6,164,698 | A  | * | 12/2000 | Gotoh | ................... | F16D 1/0864 |
| | | | | | | 280/771 |
| 2021/0300460 | A1 | * | 9/2021 | Misaki | ...................... | B62D 5/04 |
| 2021/0360843 | A1 | * | 11/2021 | Misaki | .................... | G05D 1/227 |
| 2025/0010915 | A1 | * | 1/2025 | Endo | ...................... | B62D 15/025 |
| 2025/0108704 | A1 | * | 4/2025 | Takaki | ............... | B60H 1/00271 |
| 2025/0108705 | A1 | * | 4/2025 | Takaki | ..................... | H01M 8/10 |
| 2025/0115166 | A1 | * | 4/2025 | Takaki | ............. | B60K 15/03006 |

FOREIGN PATENT DOCUMENTS

JP          202111267 A    2/2021

* cited by examiner

*Primary Examiner* — Sizo B Vilakazi
(74) *Attorney, Agent, or Firm* — The Webb Law Firm (57) ABSTRACT

A work vehicle includes a first cover extending between and attached to a gear case and a lower face of a floor, and covering a first opening in the gear case, a second opening in the floor, and an area surrounding a steering shaft between the first opening in the gear case and the second opening in the floor while separating the first opening, the second opening, and the area from a region below the floor.

6 Claims, 7 Drawing Sheets

WORK VEHICLE

CROSS-REFERENCE TO RELATED APPLICATION

This application claims priority to Japanese Patent Application No. 2023-133492 filed Aug. 18, 2023, the disclosure of which is hereby incorporated by reference in its entirety.

BACKGROUND OF THE INVENTION

1. Field of the Invention

The present invention relates to a steering configuration of a work vehicle.

2. Description of Related Art

Some work vehicles, such as a work vehicle disclosed in Patent Document 1 (JP 2021-11267A), include a steering mechanism that has a rack gear and a pinion gear and is housed in a gear case located below the floor of a driver's section.

In Patent Document 1, a steering shaft joined to the pinion gear extends upward through an opening at an upper portion of a gear case and an opening in a floor, and a steering wheel is installed at an upper portion of the steering shaft.

Front wheels (which corresponds to travel wheels) are steered by an operator in the driver's section operating the steering wheel to rotate the steering shaft and the pinion gear, thereby moving the rack gear in the left-right direction.

In work vehicles that often travel on uneven or muddy ground, soil or muddy water is likely to adhere to the gear case if the gear case is located below the floor of the driver's section.

In this case, in some types of work vehicles, a disk-shaped cover is joined to the steering shaft near the opening in the gear case such that the cover rotates integrally with the steering shaft, the outer peripheral portion of the cover is disposed in contact with the outer peripheral portion of the opening in the gear case, and the cover covers the opening in the gear case. Thus, the cover prevents soil and muddy water from entering the interior of the gear case.

SUMMARY OF THE INVENTION

In the configuration in which the cover joined to the steering shaft covers the opening in the gear case, with the outer peripheral portion of the cover being in contact with the outer peripheral portion of the opening in the gear case, the cover rotates integrally with the steering shaft upon the wheels being steered, causing the outer peripheral portion of the cover to rub against the outer peripheral portion of the opening in the gear case.

If this situation is repeated, wear progresses on the outer peripheral portion of the cover and the outer peripheral portion of the opening in the gear case, and a gap may be opened between the outer peripheral portion of the cover and the outer peripheral portion of the opening in the gear case, which may cause soil and muddy water to enter the interior of the gear case through the gap.

The present invention aims to configure a work vehicle with a gear case housing a steering mechanism being located below the floor of the driver's section such that soil and muddy water can be prevented from entering the interior of the gear case.

A work vehicle of an aspect of the present invention includes: a wheel for travel; a steering mechanism configured to steer the wheel; a gear case housing the steering mechanism; a driver's section above the gear case; a floor above the gear case and below the driver's section; a steering shaft having a steering wheel at an upper portion and extending upward from the steering mechanism through a first opening at an upper portion of the gear case and a second opening in the floor; and a first cover extending between and attached to the gear case and a lower face of the floor, and covering the first opening in the gear case, the second opening in the floor, and an area surrounding the steering shaft between the first opening in the gear case and the second opening in the floor while separating the first opening, the second opening, and the area from a region below the floor.

According to an aspect of the present invention, the first cover extends between the lower face of the floor of the driver's section and the gear case that houses the steering mechanism and is located below the floor of the driver's section.

Thus, the first cover covers the first opening in the gear case, the second opening in the floor of the driver's section, and the area surrounding the steering shaft between the first opening in the gear case and the second opening in the floor of the driver's section while separating the first opening, the second opening, and the area from the region below the floor of the driver's section.

Even when the wheel is steered, the first cover does not rotate, and no rubbing occurs between the first cover and the gear case or between the first cover and the lower face of the floor of the driver's section. There is little possibility that a gap is created between the first cover and the gear case or between the first cover and the lower face of the floor of the driver's section.

Thus, even if soil and muddy water fly near the gear case below the floor of the driver's section while the work vehicle is traveling on uneven or muddy ground, the soil and muddy water can adhere to the gear case and the outer face of the first case, but soil and muddy water cannot enter the interior of the first cover.

In this case, it seems possible for soil and muddy water to enter the interior of the first cover from above the floor of the driver's section through the second opening in the floor of the driver's section.

However, the floor of the driver's section that is sufficiently larger than the second opening in the floor of the driver's section expands above the first cover and the gear case. There is thus little possibility that the soil and muddy water flying below the floor of the driver's section pass beyond the floor of the driver's section and reach the second opening in the floor of the driver's section. In other words, the floor of the driver's section functions to prevent soil and muddy water flying below the floor of the driver's section from entering the second opening in the floor of the driver's section.

As described above, the first cover that does not rotate even while the wheel is steered is provided while effectively using the floor of the driver's section that is an existing configuration, thereby making it possible to prevent soil and muddy water from entering the interior of the gear case and improving the durability of the steering mechanism of the work vehicle.

In an aspect of the present invention, it is preferable that the work vehicle further includes a second cover covering the second opening in the floor and a portion of the steering shaft above the second opening in the floor.

Water or the like used when washing the work vehicle may reach the upper face of the floor of the driver's section.

According to an aspect of the present invention, the second cover covers the second opening in the floor of the driver's section and the portion of the steering shaft above the second opening in the floor of the driver's section. With the steering shaft extending upward through the opening in the upper part of the second cover, the opening in the second cover is positioned higher than the upper face of the floor of the driver's section.

This prevents water or the like used when washing the work vehicle from entering the interior of the first cover through the second opening in the floor of the driver's section, which is advantageous in terms of improving the durability of the steering mechanism of the work vehicle.

In this case, the gap between the steering shaft and the opening in the second cover need not be made smaller than necessary, thus making it unlikely for the steering shaft to rub against the opening in the second cover. Wear is less likely to progress in the steering shaft and the opening in the second cover.

In an aspect of the present invention, it is preferable that the work vehicle further includes a lid at a lower portion of the first cover, the lid having a third opening through which the steering shaft extends and covering the first opening in the gear case inside the first cover.

Water or the like used to wash the work vehicle may reach the upper face of the floor of the driver's section.

According to an aspect of the present invention, the lid covers the first opening in the gear case at the lower portion of the first cover, and the steering shaft extends upward through the third opening in the lid.

With this, even if water or the like used when washing the work vehicle enters the interior of the first cover and reaches the lower portion of the first cover through the second opening in the floor of the driver's section, the lid prevents the water or the like from entering the interior of the gear case, which is advantageous in terms of improving the durability of the steering mechanism of the work vehicle.

In this case, the gap between the steering shaft and the third opening in the lid need not be made smaller than necessary, thus making it unlikely for the steering shaft to rub against the third opening in the lid. Wear is less likely to progress in the steering shaft and the third opening in the lid.

In an aspect of the present invention, it is preferable that the work vehicle further includes a drain channel through which water entering an interior of the first cover and reaching the lower portion of the first cover is dischargeable to outside of the first cover.

According to an aspect of the present invention, even if water or the like used when washing the work vehicle enters the interior of the first cover through the second opening in the floor of the driver's section and reaches the lower portion of the first cover, the water or the like is discharged through the drain channel from the lower portion of the first cover to the outside of the first cover.

This is advantageous in terms of preventing water or the like used when washing the work vehicle from entering the interior of the gear case, and advantageous in terms of improving the durability of the steering mechanism of the work vehicle.

In an aspect of the present invention, it is preferable that the lower portion of the first cover is inclined such that an area of the lower portion of the first cover, the area including the drain channel, is lower than another area of the lower portion of the first cover.

According to an aspect of the present invention, water or the like used when washing the work vehicle that has reached the lower portion of the first cover are more likely to be guided to the drain channel due to the inclination of the lower portion of the first cover, thus promoting the discharge of water or the like.

This is advantageous in terms of preventing water or the like used when washing the work vehicle from entering the interior of the gear case, and advantageous in terms of improving the durability of the steering mechanism of the work vehicle.

In an aspect of the present invention, it is preferable that the lid has a vertical wall extending upward from an outer peripheral portion of the third opening of the lid along an outer peripheral portion of the steering shaft, and extending over an entire circumference of the outer peripheral portion of the third opening of the lid.

According to an aspect of the present invention, even if water or the like used when washing the work vehicle enters the interior of the first cover through the second opening in the floor of the driver's section and reaches the lower portion of the first cover, the water or the like cannot enter the third opening in the lid due to the vertical wall of the lid.

This is advantageous in terms of preventing water or the like used when washing the work vehicle from entering the interior of the gear case, and advantageous in terms of improving the durability of the steering mechanism of the work vehicle.

DESCRIPTION OF THE INVENTION

FIGS. 1 to 8 show a multipurpose work vehicle. In FIGS. 1 to 8, F indicates a forward direction, B indicates a backward direction, U indicates an upward direction, D indicates a downward direction, R indicates a rightward direction, and L indicates a leftward direction.

Overall Configuration of Work Vehicle

Figure 1:
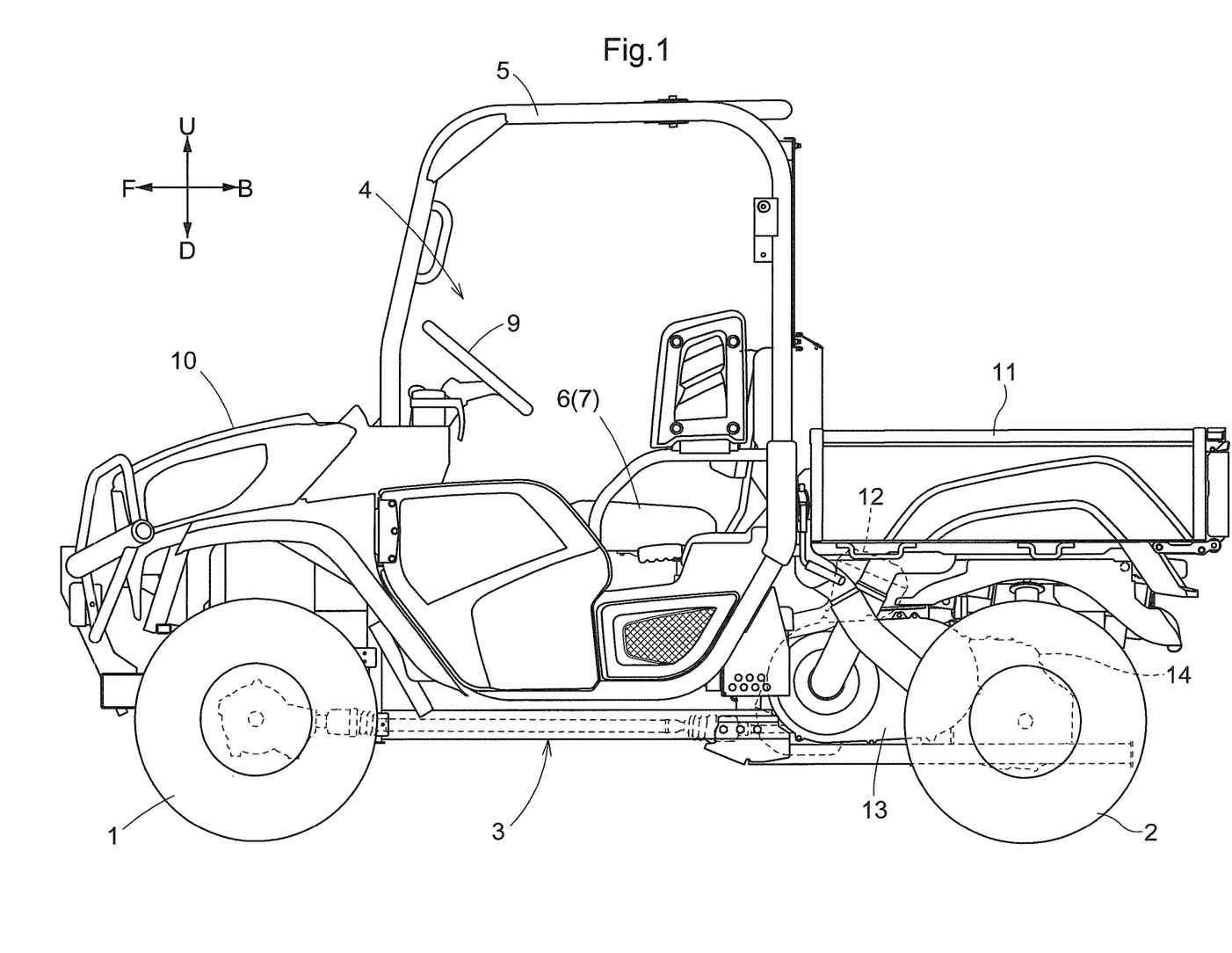
FIG. 1 is a left side view of a work vehicle.
Figure 2:
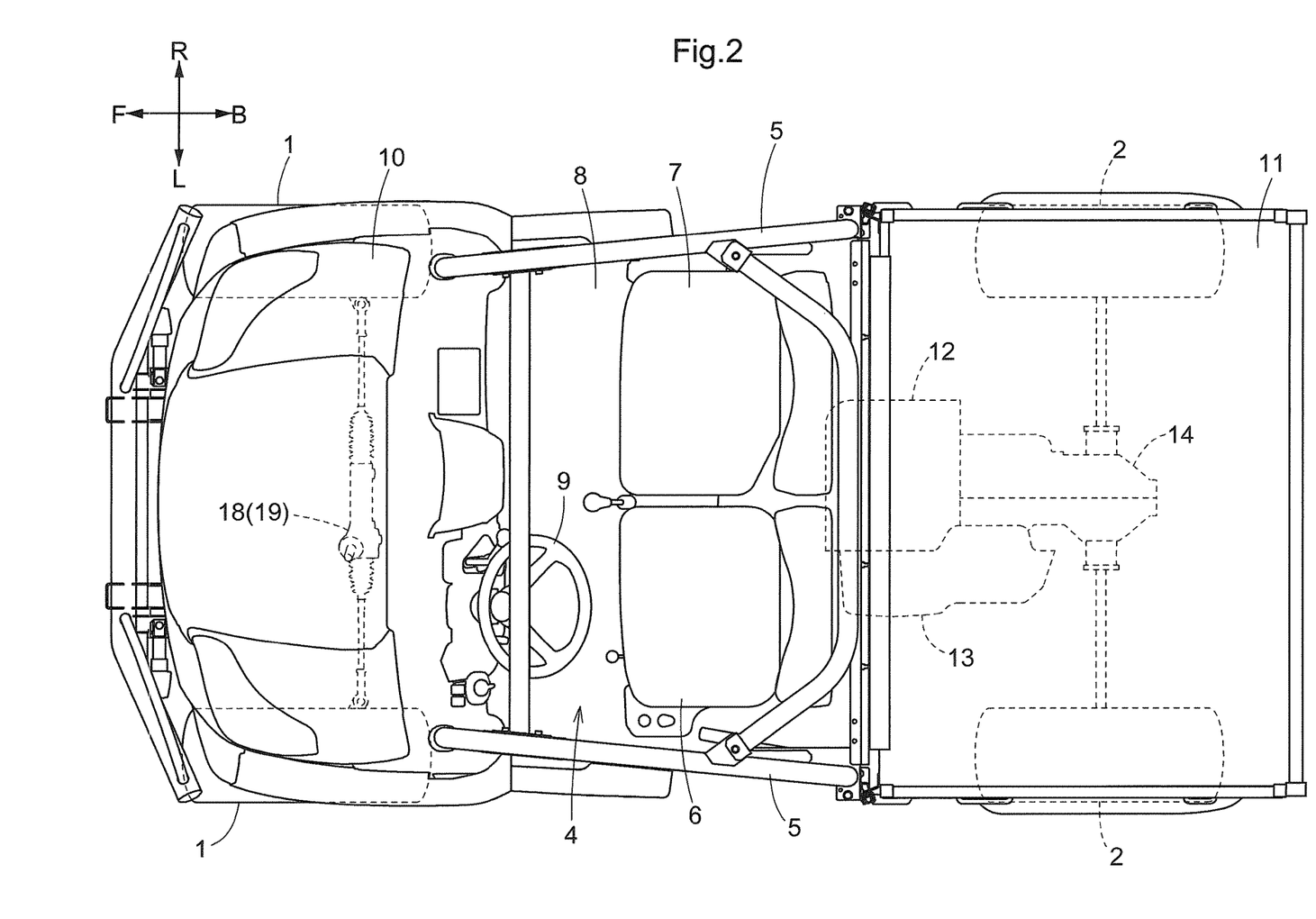
FIG. 2 is a plan view of the work vehicle.

Left and right front wheels 1 for travel (each of which corresponds to a wheel for travel) are located in a front part of a body 3, and left and right rear wheels 2 for travel are located in a rear part of the body 3, as shown in FIGS. 1 and 2. A driver's section 4 for an operator to sit is located at a portion of the body 3 between the front wheels 1 and the rear wheels 2, and is surrounded by a roll-over protective structure (ROPS) frame 5. The driver's section 4 includes an operator seat 6, a passenger seat 7, a floor 8, a steering wheel 9 for steering the front wheels 1, and so on.

A hood 10 is located forward of the driver's section 4, and a cargo bed 11 is located rearward of the driver's section 4. The cargo bed 11 can be raised and lowered between a use position indicated by solid lines in FIG. 1 and a dump position in which a front portion of the cargo bed 11 is raised with a lower rear portion of the cargo bed 11 as a support point.

An engine 12, a continuously variable transmission 13, and a transmission case 14 are located in a rear part of the body 3. The continuously variable transmission 13 is of a belt-driven type. The transmission case 14 contains an auxiliary transmission (not shown) having three forward gears and one reverse gear, and a rear-wheel differential device (not shown).

Motive power of the engine 12 is subjected to speed change by the continuously variable transmission 13, transferred to the auxiliary transmission in the transmission case 14 and subjected to speed change by the auxiliary transmission, and transferred from the rear-wheel differential device to the rear wheels 2. Motive power diverted from between the auxiliary transmission and the rear-wheel differential device is transferred to the front wheels 1 via transmission shafts (not shown).

Configuration for Steering Front Wheels

Figure 3:
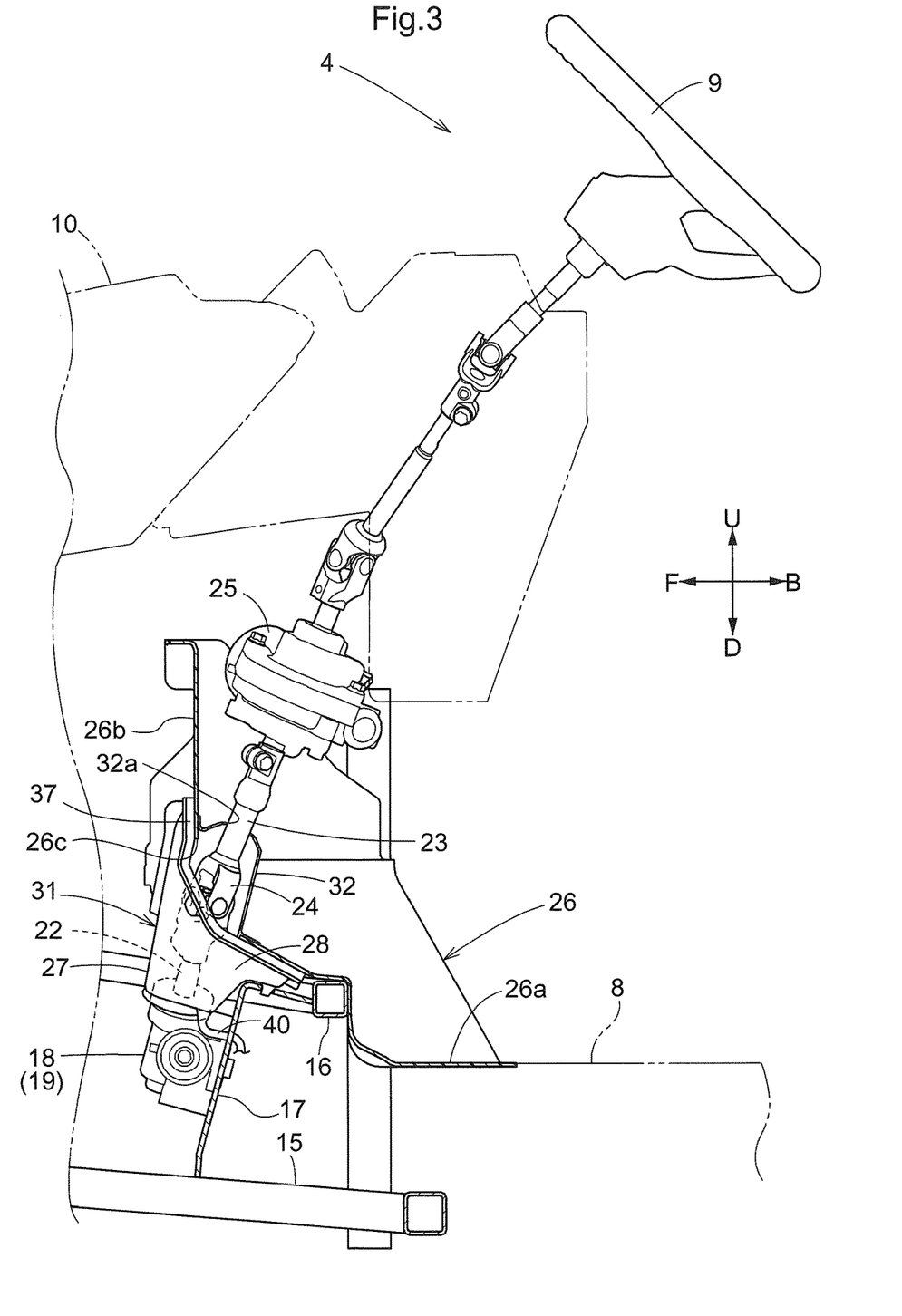
FIG. 3 is a longitudinal left side view of a region around a first cover, a second cover, a front panel, a steering mechanism, and a gear case.
Figure 4:
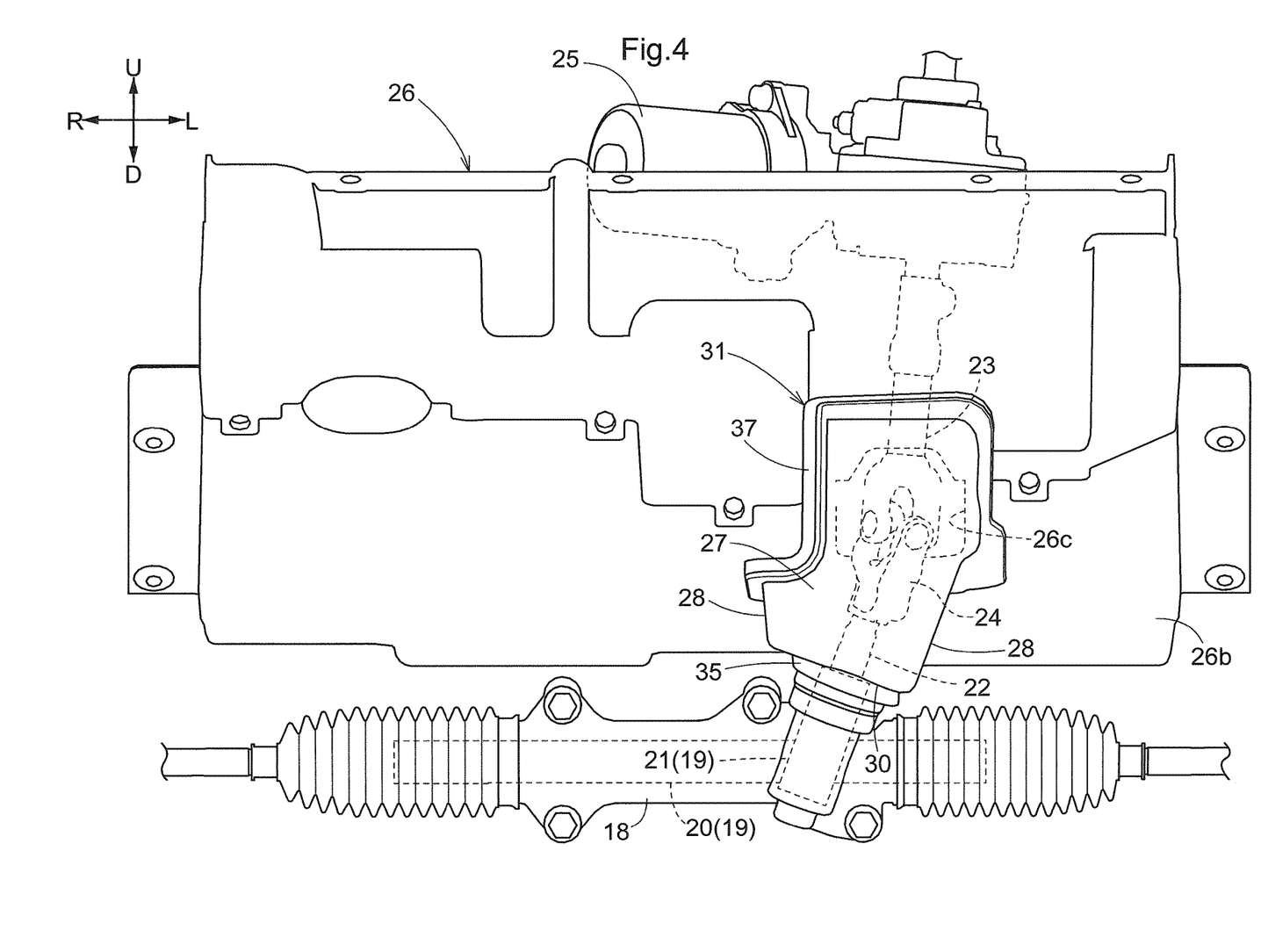
FIG. 4 is a front view of a region around the first cover, the front panel, the steering mechanism, and the gear case.
Figure 5:
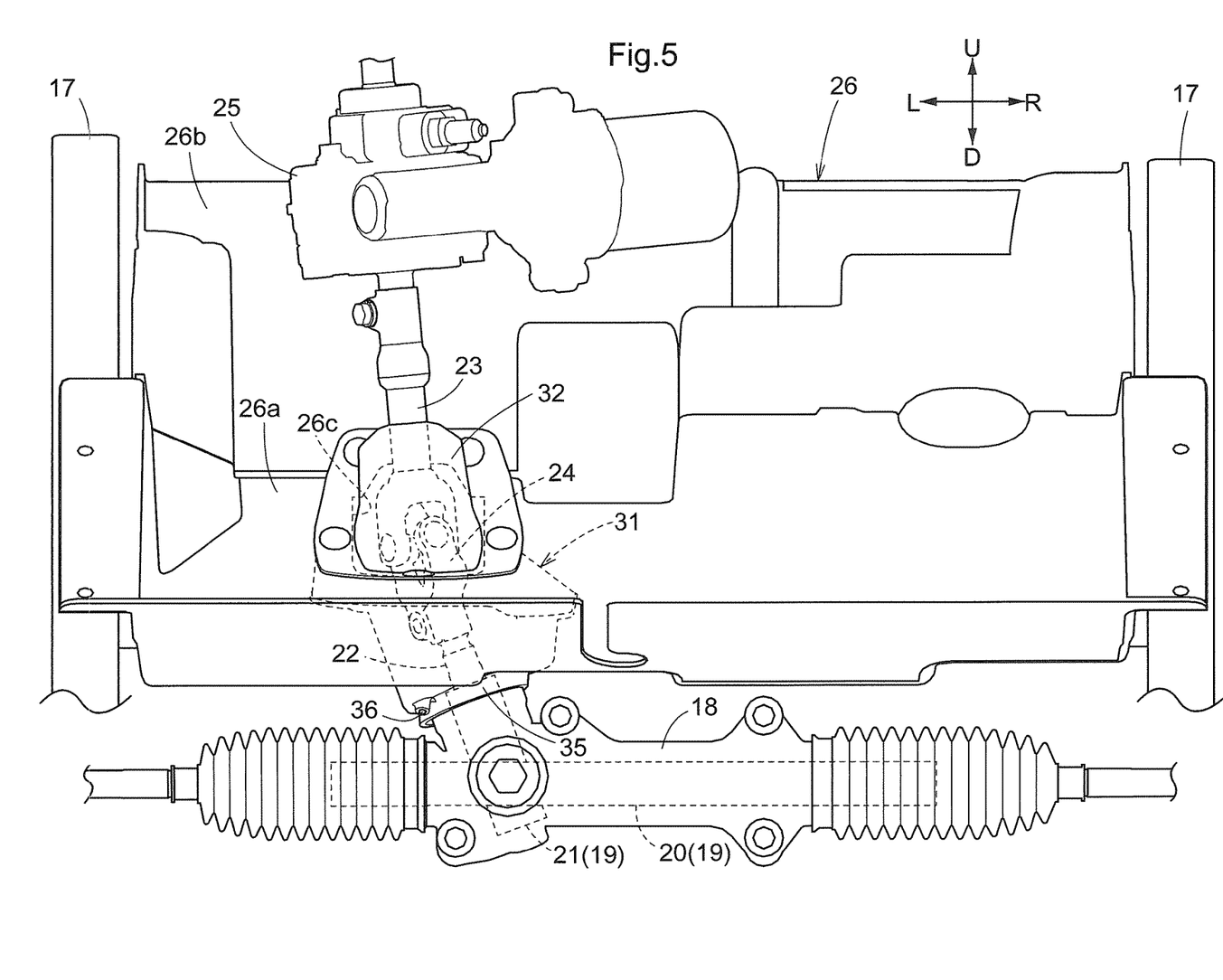
FIG. 5 is a back view of a region around the first cover, the second cover, the front panel, the steering mechanism, and the gear case.

As shown in FIGS. 3, 4, and 5, pipe-shaped left and right frames 15 extend in the front-back direction at a front lower portion of the body 3. A pipe-shaped frame 16 extends in the left-right direction at a front lower portion of the body 3. A flat plate-shaped frame 17 extends between and is joined to the frames 15 and 16.

A gear case 18 is joined to the frame 17 and houses a steering mechanism 19. The steering mechanism 19 is of a rack-and-pinion type with a rack gear 20 and a pinion gear 21.

The rack gear 20 of the steering mechanism 19 is located within the gear case 18, movable in the left-right direction, and protrudes laterally outward from left and right portions of the gear case 18. The front wheels 1 are supported by left and right uprights (not shown), which are connected to the rack gear 20 via tie rods (not shown).

Figure 6:
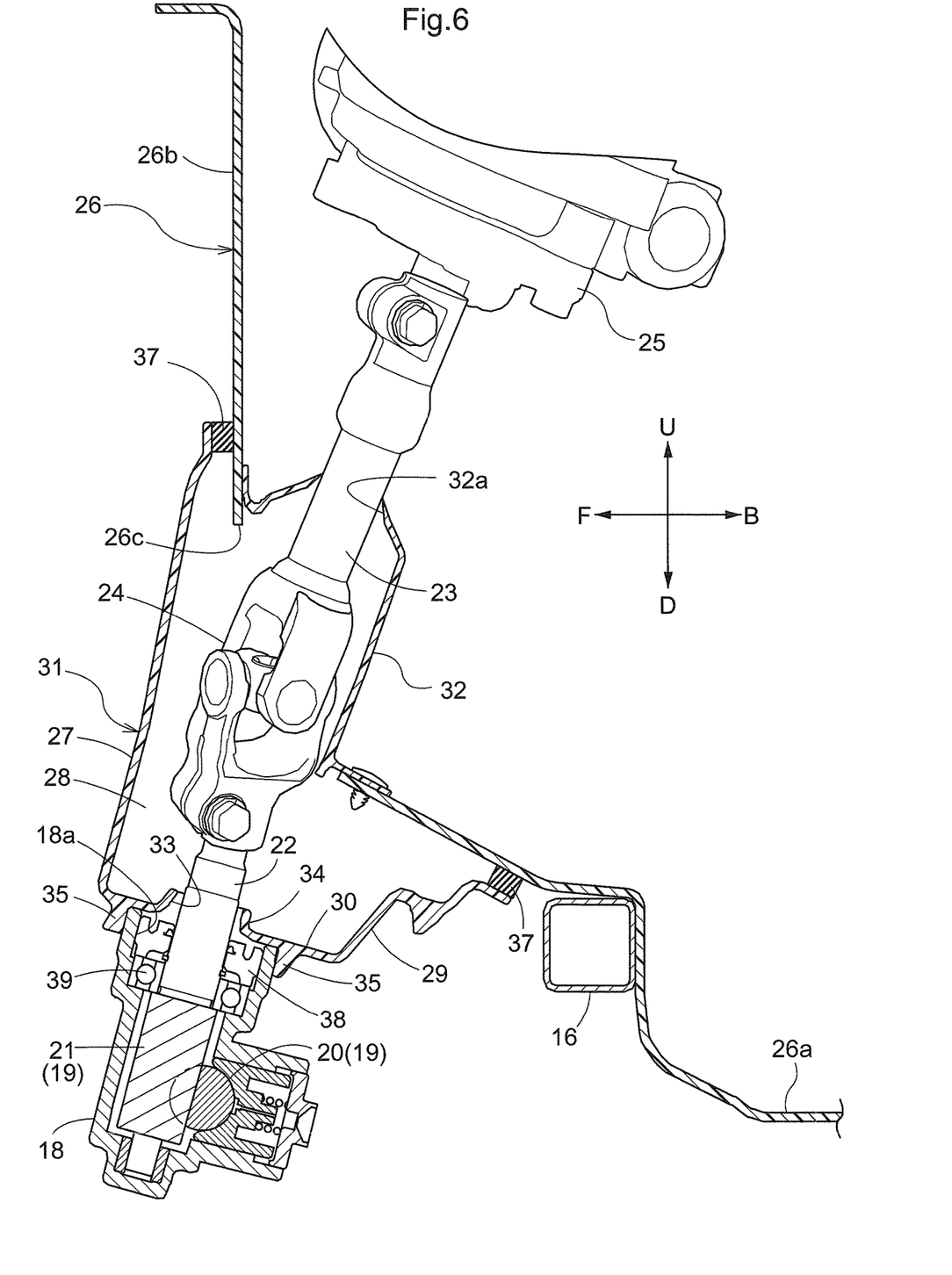
FIG. 6 is a longitudinal left side view of a region around the first cover, the second cover, the front panel, the steering mechanism, and the gear case.

The pinion gear 21 of the steering mechanism 19 is rotatable within the gear case 18 and meshes with the rack gear 20, as shown in FIG. 6. The steering shaft 22 is joined to the pinion gear 21 and extends upward from a first opening 18a in the gear case 18. A seal member 38 and a bearing 39 are provided in the first opening 18a in the gear case 18.

As shown in FIGS. 3 to 6, steering shaft 23 has a lower portion connected to an upper portion of the steering shaft 22 via a universal joint 24, and an upper portion connected to the steering wheel 9. An electrical power steering mechanism 25 is installed on the steering shaft 23.

The front wheels 1 are steered by the operator at the operator seat 6 operating the steering wheel 9 to rotate the pinion gear 21 via the steering shafts 22 and 23 and the power steering mechanism 25 and move the rack gear 20 in the left-right direction.

Configuration of Front Panel and Second Cover

As shown in FIGS. 3 to 6, a front panel 26 (which corresponds to the floor 8) is connected to a front portion of the floor 8, and serves as a part of the front portion of the floor 8. The front panel 26 is attached to the frame 16 and located above the gear case 18.

The front panel 26 has a lower section 26a connected to the front portion of the floor 8 and extending forward, and a front section 26b extending upward from a front portion of the lower section 26a, and is an integrally molded member made of synthetic resin. The front panel 26 has a second opening 26c at a connection area between the lower section 26a and the front section 26b.

A second cover 32 is attached to an upper face of the connection area of the front panel 26 between the lower section 26a and the front section 26b, and covers the second opening 26c in the front panel 26 from above. The second cover 32 extends upward from the lower section 26a of the front panel 26, and has an opening 32a at its upper portion.

The steering shafts 22 and 23 extend upward through the second opening 26c in the front panel 26 and into the second cover 32. The universal joint 24 is located within the second cover 32. The steering shaft 23 extends upward through the opening 32a in the second cover 32, and the power steering mechanism 25 is located above the second cover 32.

Based on the above configuration, the work vehicle includes the wheels (front wheels 1) for travel, the steering mechanism 19 for steering the wheels (front wheels 1), the gear case 18 housing the steering mechanism 19, the driver's section 4 above the gear case 18, and the floor 8 (front panel 26) above the gear case 18 and below the driver's section 4.

The steering shafts 22 and 23 extend upward from the steering mechanism 19 through the first opening 18a at the upper portion of the gear case 18 and the second opening 26c in the floor 8 (front panel 26), and the steering wheel 9 is provided at an upper portion of the steering shaft 23.

The second cover 32 covers the second opening 26c in the floor 8 (front panel 26) and a portion of the steering shafts 22 and 23 above the second opening 26c in the floor 8 (front panel 26).

Configuration of First Cover

Figure 7:
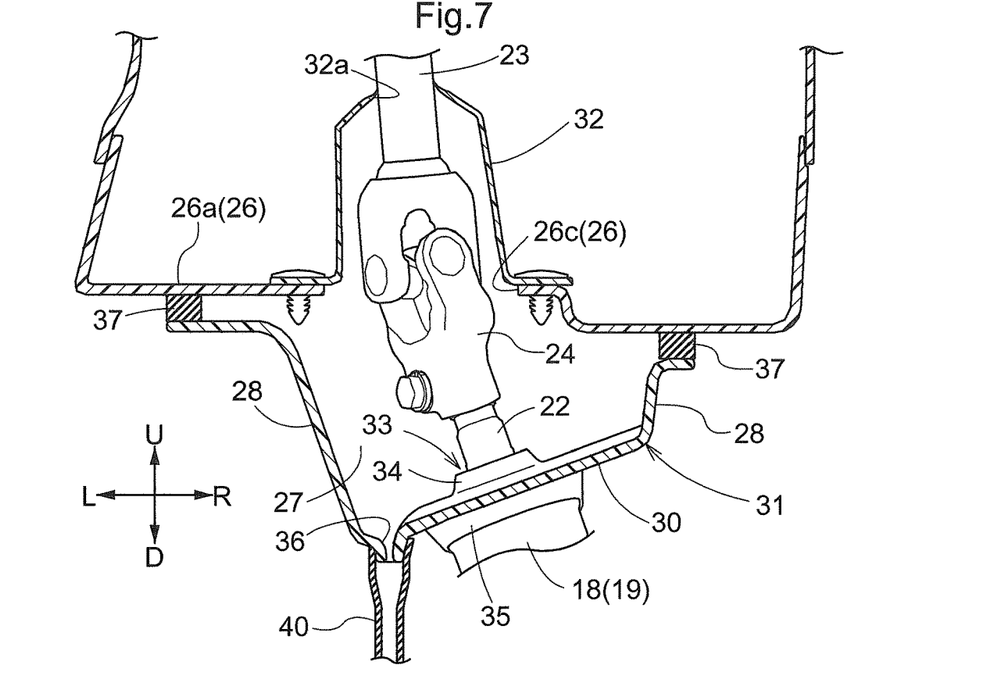
FIG. 7 is a longitudinal back view of a region around the first cover, the second cover, and the front panel.
Figure 8:
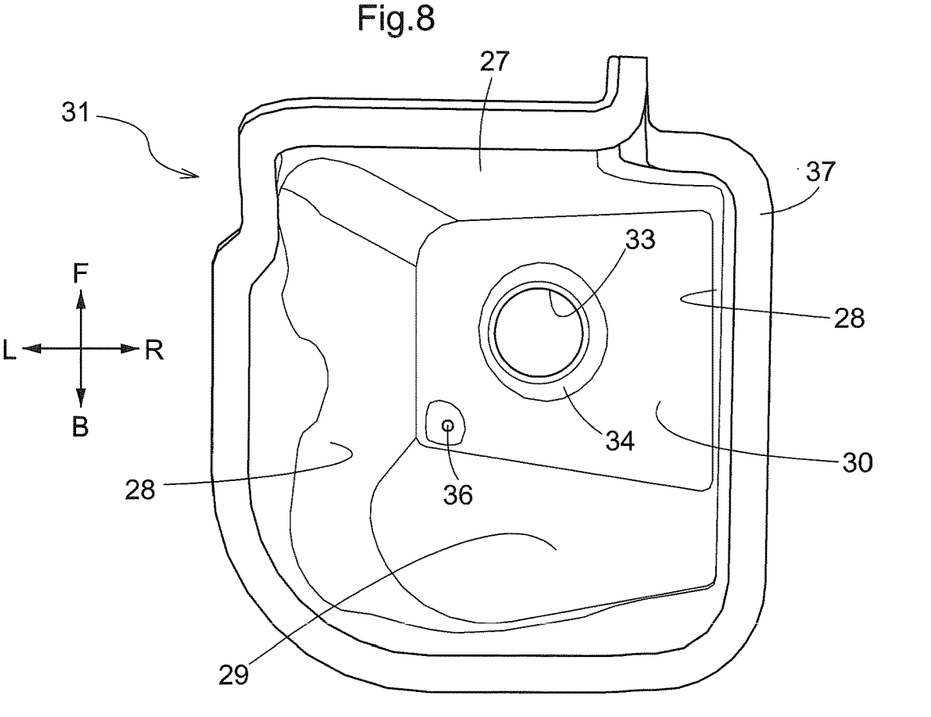
FIG. 8 is a plan view of the first cover.

A first cover 31 extends between and is attached to the gear case 18 and the front panel 26, as shown in FIGS. 3 to 6. The first cover 31 is an integrally molded member made of synthetic resin, and has a front portion 27, left and right side portions 28, a rear portion 29, a lower portion 30, and so on, as shown in FIGS. 6, 7 and 8.

The lower portion 30 of the first cover 31 has a rectangular shape in a plan view, and has a third opening 33 in its center area. A vertical wall 34 extending upward from an upper face of the lower portion 30 extends over the entire circumference of the outer peripheral portion of the third opening 33. A vertical wall 35 extending downward from a lower face of the lower portion 30 extends over the entire circumference of a portion slightly outward of the outer peripheral portion of the third opening 33.

The first cover 31 has a drain hole 36 (which corresponds to a drain channel) at a rear left corner of the lower portion 30. The drain hole 36 is located outward of the third opening 33 and the vertical walls 34 and 35.

Attachment State of First Cover

The front portion 27, the side portions 28, and the rear portion 29 of the first cover 31 are attached to a lower face of the lower section 26a and a front face of the front section 26b of the front panel 26, with a gasket 37 between the first cover 31 and the front panel 26, as shown in FIGS. 3 to 7.

Thus, the front portion 27, the side portions 28, and the rear portion 29 of the first cover 31 cover the entire circumference of the second opening 26c in the front panel 26 from below. The gasket 37 is attached to and extends over the entire circumference of the outer peripheral portion of the second opening 26c in the front panel 26.

The lower portion 30 of the first cover 31 is pressed against the outer peripheral portion of the first opening 18a in the gear case 18 over the entire circumference. The first opening 18a in the gear case 18 is located inside the vertical wall 35 of the first cover 31, and the vertical wall 35 of the first cover 31 is in contact with the outer face of the outer peripheral portion of the first opening 18a in the gear case 18 over the entire circumference.

The lower portion 30 of the first cover 31 blocks the first opening 18a in the gear case 18. The area including the third opening 33 at the lower portion 30 of the first cover 31 serves as a lid, and the third opening 33 and the vertical wall 34 are provided in the lid. The steering shaft 22 extends upward through the third opening 33 in the first cover 31 (lid).

The lower portion 30 of the first cover 31 in an attached state is inclined diagonally rearward and leftward, and the area including the drain hole 36 is located is at the lowest position in the lower portion 30 of the first cover 31. The drain hole 36 is connected to a drain hose 40 (which corresponds to a drain channel).

With this, the first cover 31 covers the second opening 26c in the front panel 26 from below, covers and blocks the first opening 18a in the gear case 18 from above, and covers the area surrounding the steering shafts 22 and 23.

It is assumed, for example, that water or the like used when washing the work vehicle has entered the interior of the second cover 32 through the opening 32a in the second cover 32.

In this case, the water or the like enters the interior of the first cover 31 through the second opening 26c in the front panel 26 along the inner face of the second cover 32, and reaches the lower portion 30 of the first cover 31 along the inner faces of the front portion 27, the side portion 28, and the rear portion 29 of the first cover 31.

The water or the like that has reached the lower portion 30 of the first cover 31 flows along the inclination of the lower portion 30 of the first cover 31, reaches the drain hole 36 in the first cover 31, and is discharged from the drain hole 36 in the first cover 31 to the outside of the first cover 31 via the drain hose 40. Even if the water or the like flows near the third opening 33 in the first cover 31, the vertical wall 34 of the first cover 31 prevents the water or the like from entering the interior of the third opening 33 of the first cover 31.

Based on the above configuration, the first cover 31 extends between the gear case 18 and the lower face of the floor 8 (front panel 26), and covers the first opening 18a in the gear case 18, the second opening 26c in the floor 8 (front panel 26), and the area surrounding the steering shafts 22 and 23 between the first opening 18a in the gear case 18 and the second opening 26c in the floor 8 (front panel 26)), while separating the first opening 18a, the second opening 26c, and the area from a region below the floor 8 (front panel 26).

The lid (lower portion 30) is located at the lower portion 30 of the first cover 31, has the third opening 33 through which the steering shaft 22 extends, and covers the first opening 18a in the gear case 18 inside the first cover 31.

The drain channel (drain hole 36 and drain hose 40) allows water that has entered the interior of the first cover 31 and reached the lower portion 30 of the first cover 31 to be discharged to the outside of the first cover 31.

The lower portion 30 of the first cover 31 is inclined such that the area including the drain channel (drain hole 36) at the lower portion 30 of the first cover 31 is lower than the other areas of the lower portion 30 of the first cover 31.

The vertical wall 34 extends upward from the outer peripheral portion of the third opening 33 in the lid (lower portion 30) along the outer peripheral portion of the steering shaft 22, and extends over the entire circumference of the outer peripheral portion of the third opening 33 in the lid (lower portion 30).

First Variation for Carrying Out the Invention

The area including the third opening 33 at the lower portion 30 of the first cover 31 may be provided as a separate lid (not shown).

With this configuration, the third opening 33 and the vertical wall 34 are provided in the separate lid, which is attached to the lower portion 30 of the first cover 31.

Second Variation for Carrying Out the Invention

The area (lid) including the third opening 33 at the lower portion 30 of the first cover 31 may be eliminated.

With this configuration, the first opening 18a in the gear case 18 is open inward of the first cover 31, and the gap between the opening 32a in the second cover 32 and the steering shaft 23 may thus be made sufficiently small. Alternatively, the second cover 32 may be made sufficiently tall so as to extend to the vicinity of the steering wheel 9.

Third Variation for Carrying Out the Invention

A steering mechanism 19 of a pitman arm type may be employed instead of the steering mechanism 19 of a rack and pinion type.

Fourth Variation for Carrying Out the Invention

Instead of the front wheels 1 being steered, the rear wheels 2 may be steered as in the case of a forklift, and the present invention may be employed for a steering mechanism 19 for the rear wheels 2.

The present invention can be applied not only to a work vehicle with an engine installed, but also to an electric work vehicle with a motor for travel and a hybrid work vehicle with an engine and a motor for travel.

DESCRIPTION OF REFERENCE SIGNS

1 Front wheel (wheel)
4 Cab section
8 Floor
9 Steering wheel
18 Gear case
18a First opening
19 Steering mechanism
22 Steering shaft
23 Steering shaft
26 Front panel (floor)
26c Second opening
Lower portion (lid)
31 First cover
32 Second cover
33 Third opening
34 Vertical wall
36 Drain hole (drain channel)
40 Drain hose (drain channel)

What is claimed is:

1. A work vehicle comprising:
   a wheel for travel;
   a steering mechanism configured to steer the wheel;
   a gear case housing the steering mechanism;
   a driver's section above the gear case;
   a floor above the gear case and below the driver's section;
   a steering shaft having a steering wheel at an upper portion and extending upward from the steering mechanism through a first opening at an upper portion of the gear case and a second opening in the floor; and
   a first cover extending between and attached to the gear case and a lower face of the floor, and covering the first opening in the gear case, the second opening in the floor, and an area surrounding the steering shaft between the first opening in the gear case and the second opening in the floor while separating the first opening, the second opening, and the area from a region below the floor.

2. The work vehicle according to claim 1, further comprising:
a second cover covering the second opening in the floor and a portion of the steering shaft above the second opening in the floor.

3. The work vehicle according to claim 1, further comprising:
a lid at a lower portion of the first cover, the lid having a third opening through which the steering shaft extends and covering the first opening in the gear case inside the first cover.

4. The work vehicle according to claim 3, further comprising:
a drain channel through which water entering an interior of the first cover and reaching the lower portion of the first cover is dischargeable to outside of the first cover.

5. The work vehicle according to claim 4, wherein:
the lower portion of the first cover is inclined such that an area of the lower portion of the first cover, the area including the drain channel, is lower than another area of the lower portion of the first cover.

6. The work vehicle according to claim 3, wherein:
the lid has a vertical wall extending upward from an outer peripheral portion of the third opening of the lid along an outer peripheral portion of the steering shaft, and extending over an entire circumference of the outer peripheral portion of the third opening of the lid.

* * * * *